(12) United States Patent
Tseng

(10) Patent No.: US 6,257,375 B1
(45) Date of Patent: Jul. 10, 2001

(54) BRAKE-TUNING DEVICE OF A BICYCLE

(75) Inventor: Yi-Po Tseng, Taipei (TW)

(73) Assignee: Horng Jia Industry Co., Ltd., Chang Hwa Hsein (TW)

( * ) Notice: Subject to any disclaimer, the term of this patent is extended or adjusted under 35 U.S.C. 154(b) by 0 days.

(21) Appl. No.: 09/377,519

(22) Filed: Aug. 19, 1999

(51) Int. Cl.$^7$ ....................................... B62L 1/06
(52) U.S. Cl. ..................... 188/24.19; 188/24.12
(58) Field of Search ................ 188/24.11, 24.19, 188/24.12, 24.21, 24.22, 196 M

(56) References Cited

U.S. PATENT DOCUMENTS

| 5,495,920 | * | 3/1996 | Tsuyoshi | 188/24.22 |
| 5,740,889 | * | 4/1998 | Tsai | 188/24.19 |
| 5,788,020 | * | 8/1998 | Tseng | 188/24.12 |
| 5,853,069 | * | 12/1998 | Lee et al. | 188/24.19 |
| 5,996,743 | * | 12/1999 | Tseng | 188/24.19 |

* cited by examiner

Primary Examiner—Robert J. Oberleitner
Assistant Examiner—Mariano Sy
(74) Attorney, Agent, or Firm—A & J

(57) ABSTRACT

An improved structure of a brake-tuning device for a bicycle, and in particular, relates to a tuning device for the brake of a bicycle by having an adjusting bolt to regulate the distance between the brake arm and the wheel frame so that the braking operation is effective. The brake-tuning device comprises a brake arm, a holding seat urging the lateral edge of the brake arm, an adjusting bolt being mounted onto the holding seat, an adjusting rim mounted on the holding seat, a cable having one end mounted to the brake arm and the other end mounted to the holding seat, and an annular insert mounted on the fork of the bicycle and being used to secure the brake-tuning device thereto.

1 Claim, 8 Drawing Sheets

BRAKE-TUNING DEVICE OF A BICYCLE

BACKGROUND OF THE INVENTION (a) Field of the Invention

The present invention relates to an improved structure of a brake-tuning device for a bicycle, and in particular, relates to a tuning device for the brake of a bicycle by having an adjusting bolt to regulate the distance between the brake arm and the wheel frame so that the braking operation is effective.

(b) Description of the Prior Art

FIGS. 1 to 3 show the structure of a conventional brake-tuning device comprising a braking arm 1, an annular rim 6 mounted onto the braking arm 1, a locking seat 7 having an adjusting bolt 71 positioned on one lateral side thereof, an adjusting block 8 mounted within the locking seat 7 with one end urging against the adjusting bolt 71, and a spring 91 having one end mounted to the adjusting block 8 and the other end mounted to an insert 9. When the braking arm 1 is not balanced in the process of braking, the adjusting bolt 71 can be adjusted by rotating the bolt 71 clockwise (inward) such that the bolt 71 urges the adjusting block 8 and drives the spring 91 to deform. Thus, the distance between the braking arm 1 and the wheel frame is adjusted to provide an effective braking operation. However, the conventional brake-tuning structure has the following drawbacks:

1. Adjustment of brake is not precise

In the conventional brake tuning, the annular rim 6, the locking seat 7 and the adjusting block 8 are involved in order to proceed with the fine adjustment of the brake (as shown in FIG. 3A). However, as these parts are not so precisely made during the manufacturing process, therefore, it is not possible to achieve precise fine tuning of brake. Furthermore, if the adjusting block 8 is biased towards the locking position of the adjusting bolt 71, the alignment of the adjusting block 8 with the adjusting bolt 71 cannot be obtained (refer to FIG. 3B). When the guarding edge 72 of the adjusting block 8 is too long, the adjusting block 8 cannot be accurately urged against (refer to 3C). In another situation, when the annular rim 6 is too thin and the adjusting block 8 protruded beyond the locking seat 7, the adjusting of the bolt 71 does not urge the adjusting block 8 (refer to FIG. 3D) and the brake-tuning cannot be achieved.

2. High cost in combination of parts:

As the conventional brake tuning involves a plurality of parts, the combination of these parts are too complicated and it causes problem in the storage of these parts.

3. Inconvenient for subsequent brake tuning

As the container 92 for these parts is discarded after the first adjustment of the brake, if subsequent brake tuning is needed, these parts shall be scattered everywhere. Thus, the final installation of these part may be not convenient.

SUMMARY OF THE INVENTION

Accordingly, it is an object of the present invention to provide an improved structure of a brake-tuning device, wherein the adjusting of bolt 21 rotates the holding seat 2, which in turn causes the cable 4 to deform, and the distance between the brake arm 1 and the wheel frame is adjusted to provide an effective braking operation.

It is yet another object of the present invention to provide an improved structure of a brake-tuning device, wherein the stopping block 31 is an elongated shaped which provides a larger urging area to the bolt 21, so that the bolt 21 will accurately urge the stopping block 31. In other words, the parts for such a braking system do not need to be very precise and the cost of manufacturing for these parts can be lowered.

Another object of the present invention is to provide an improved structure of a brake-tuning device of a bicycle, wherein no large storage for these parts is required as the parts needed for the present device are lesser than that of the conventional brake-tuning device.

Yet another object of the present invention is to provide an improved structure of a brake-tuning device of a bicycle, wherein the parts are installed onto the forks of the bicycle and will not easily dislocated from the bicycle.

These and other objects and features of the invention will be apparent from the following detailed description taken with reference to the accompanying drawings.

DETAILED DESCRIPTION OF THE PRESENT INVENTION

Figure 1:
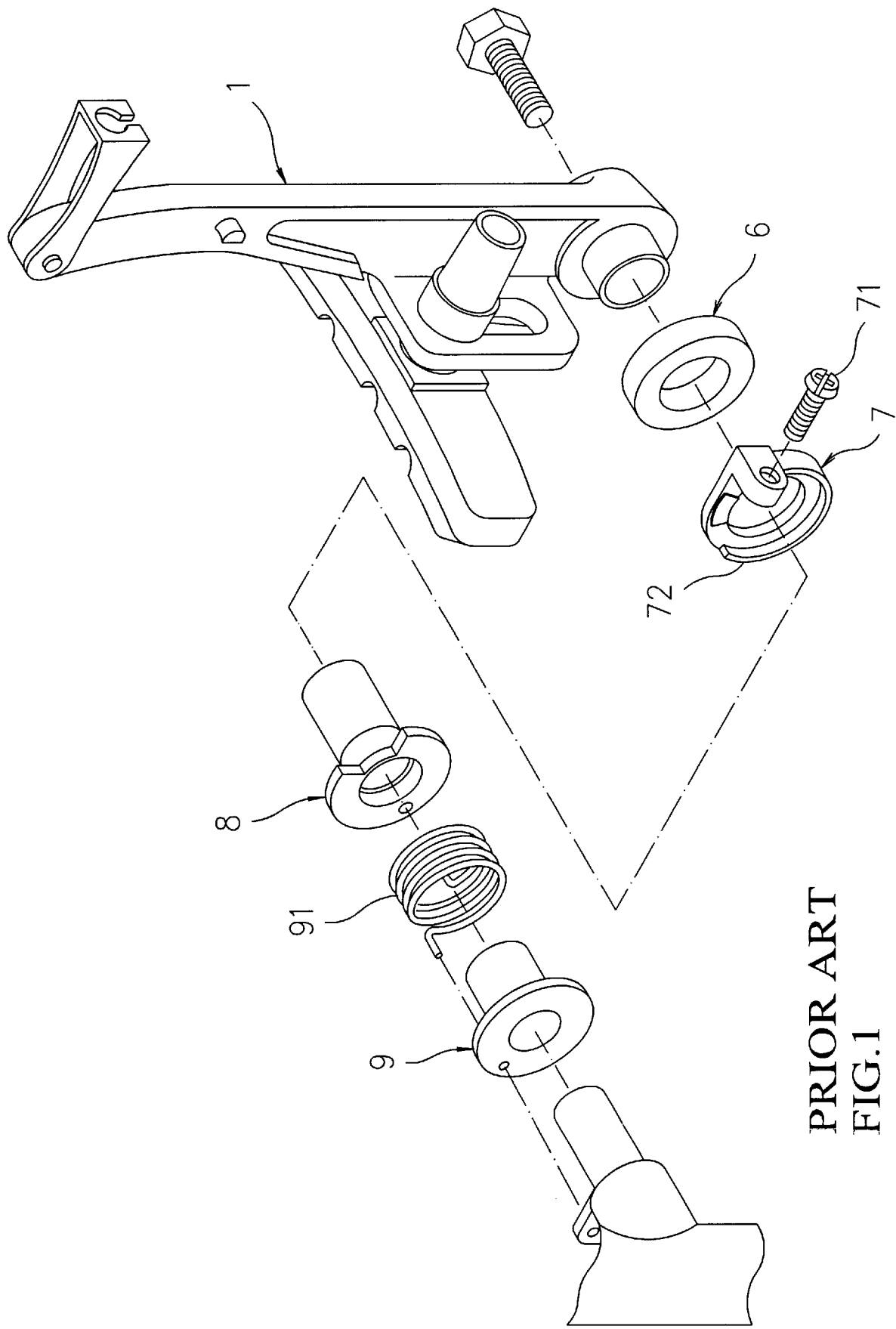
FIG. 1 is a perspective exploded view of a conventional brake-tuning device.
Figure 2:
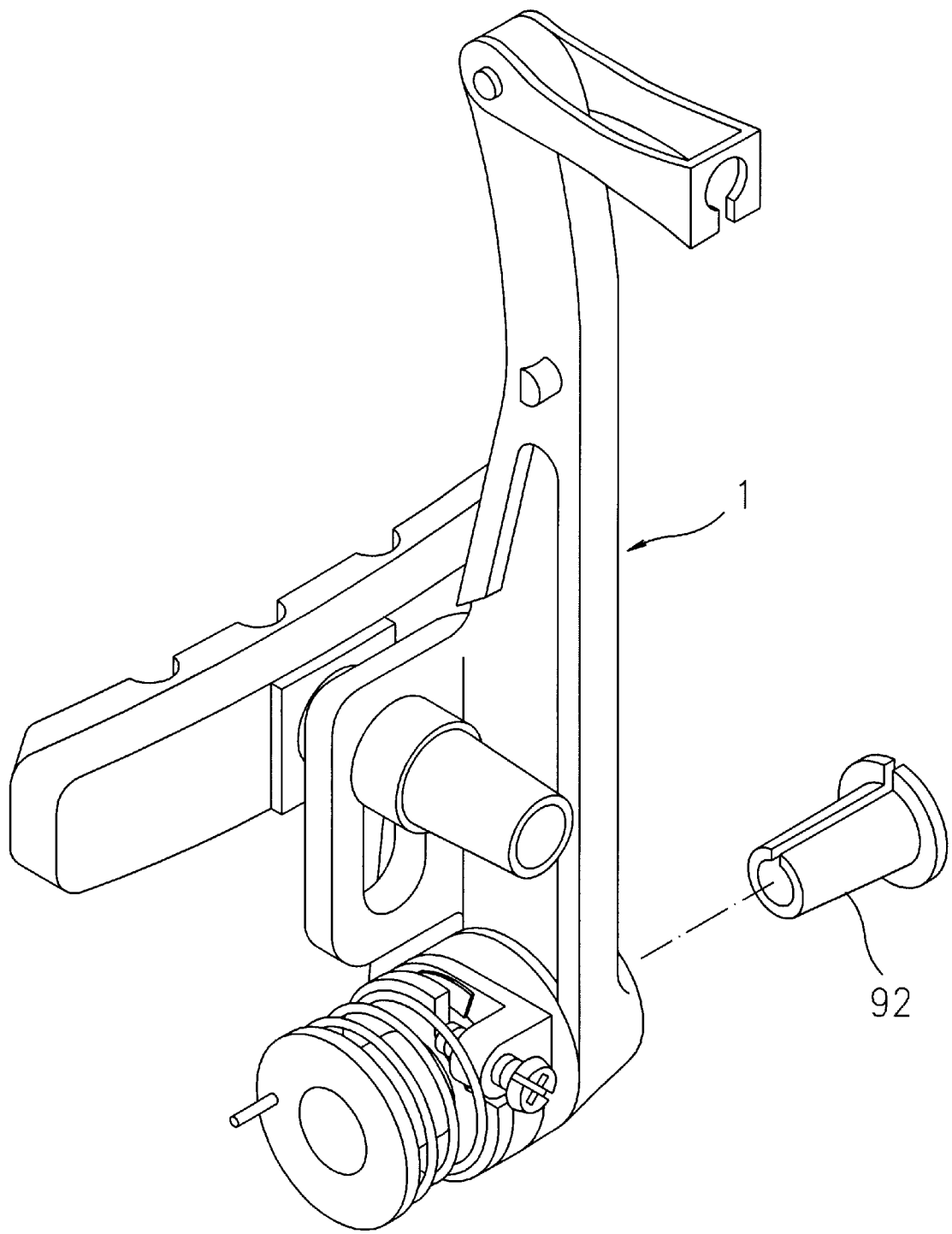
FIG. 2 is a perspective view of a conventional brake-tuning device.
Figure 3A:
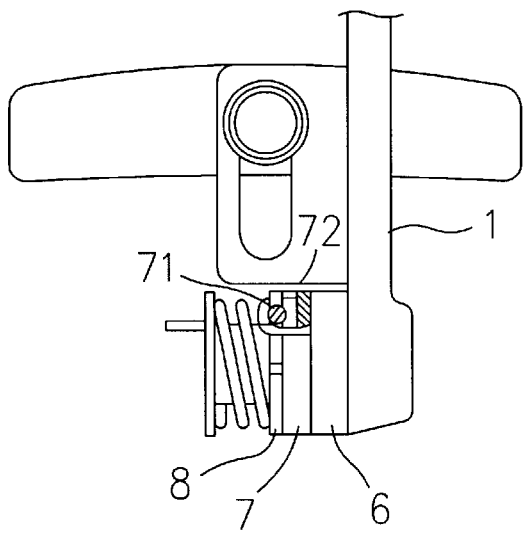
FIGS. 3A to 3D are sectional views of a conventional brake-tuning device, showing various implementations of the brake-tuning device.
Figure 3C:
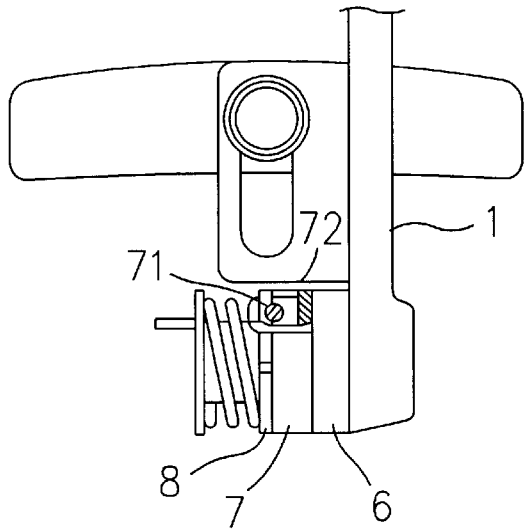
Figure 3B:
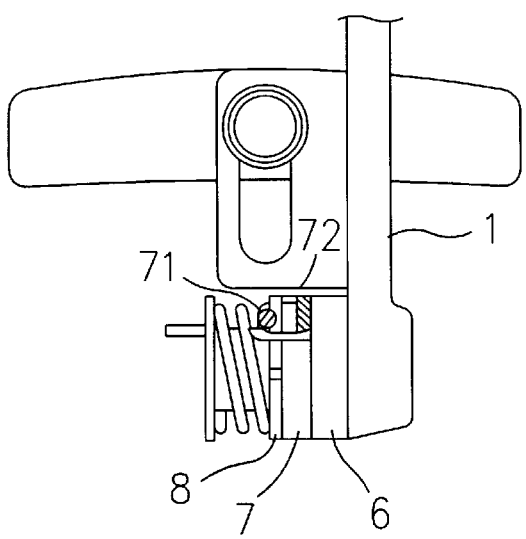
Figure 3D:
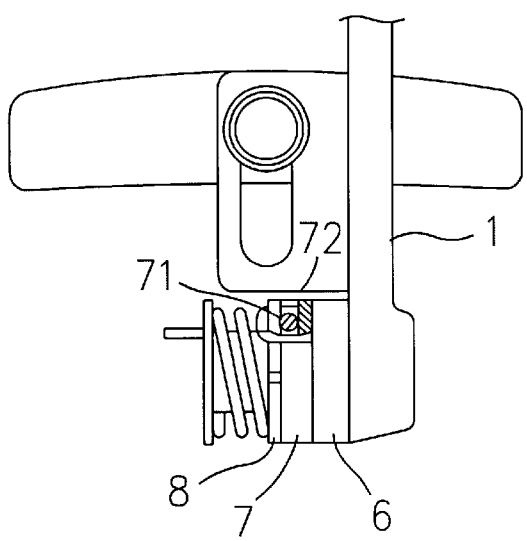
Figure 4:
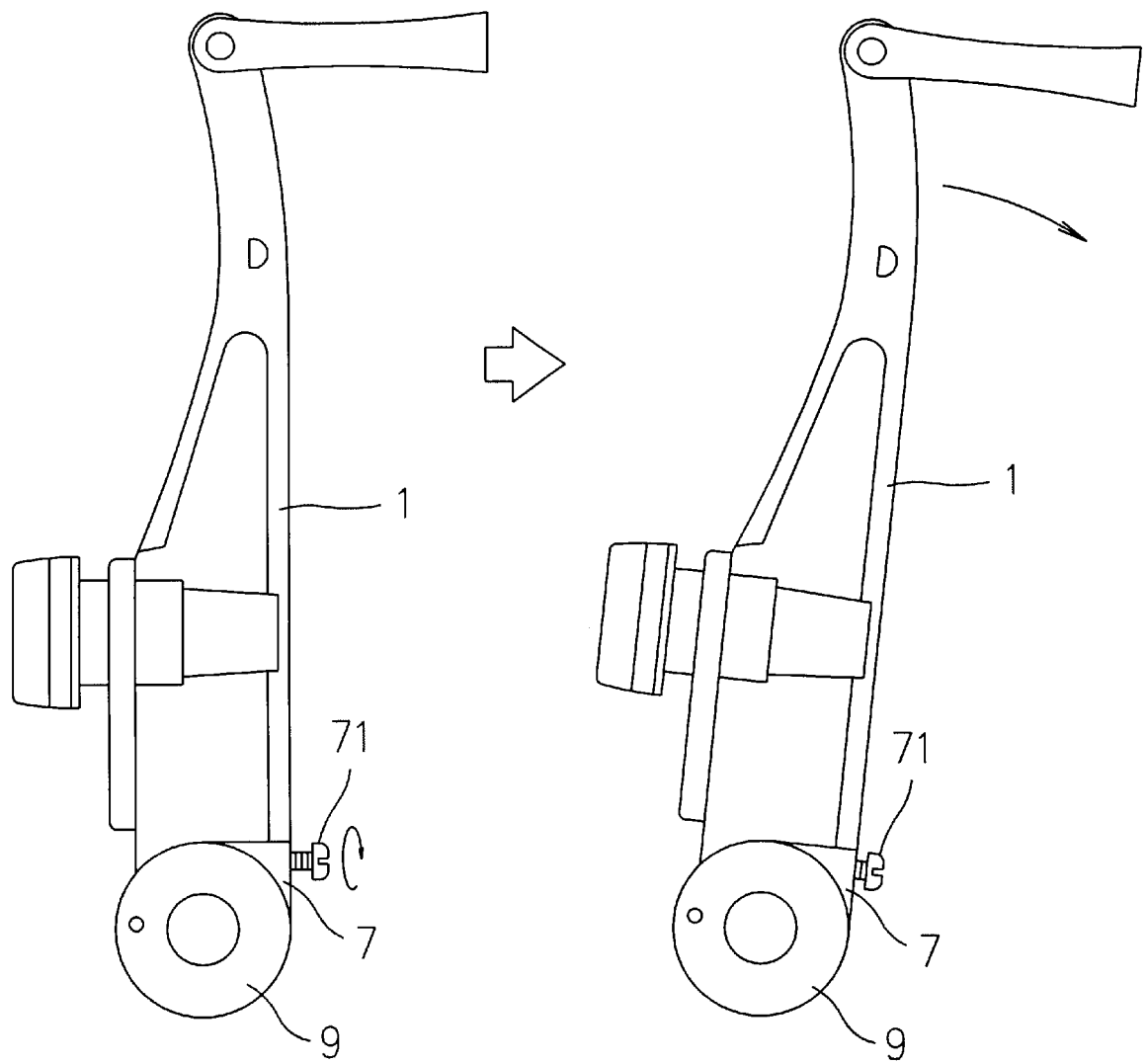
FIG. 4 is a sectional views of conventional brake-tuning device.
Figure 5:
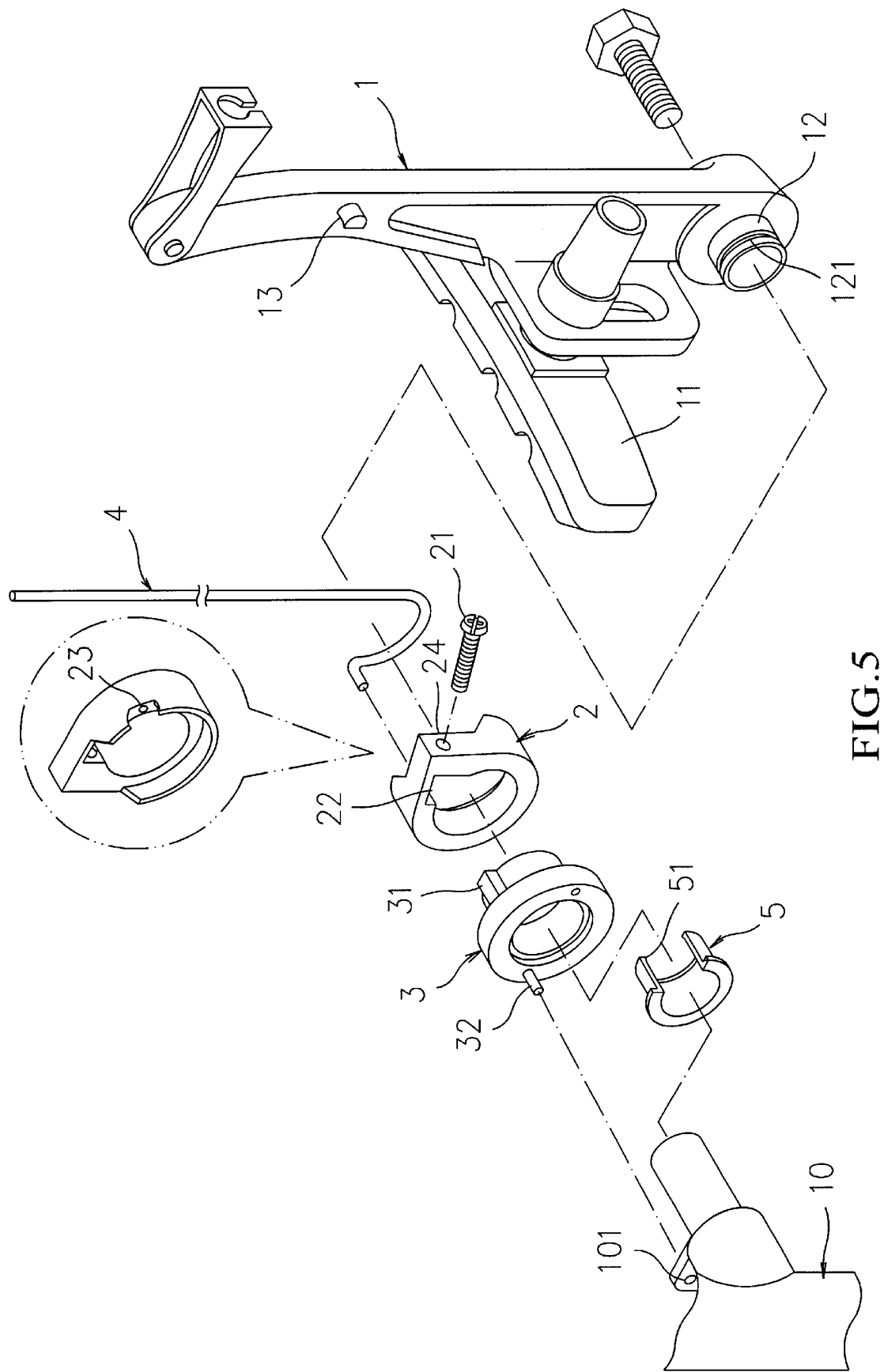
FIG. 5 is a perspective exploded view of a brake-tuning device in accordance with the present invention.
Figure 6:
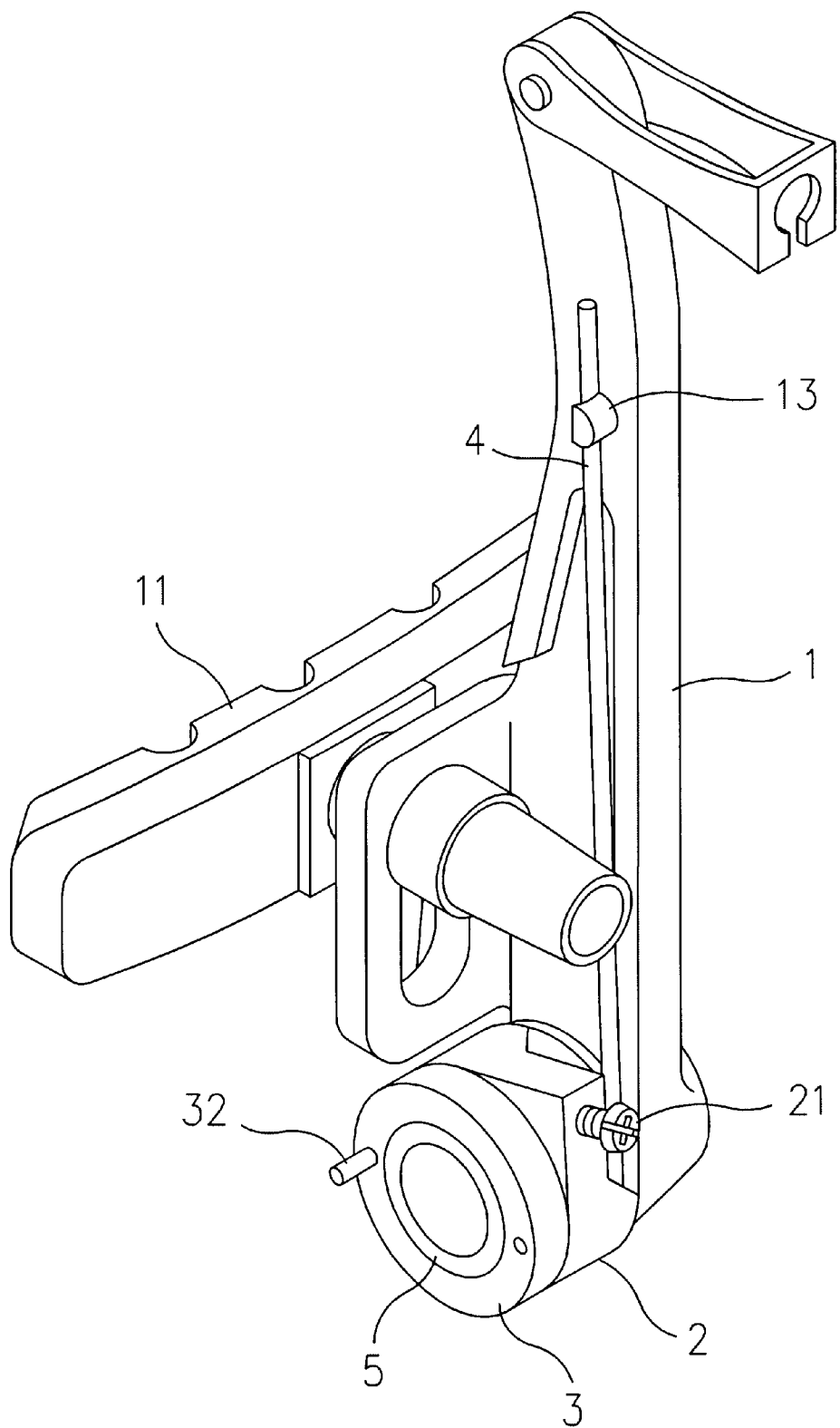
FIG. 6 is a perspective view of a brake-tuning device in accordance with the present invention.

Referring to FIGS. 5 and 6, there is shown an improved structure of a brake-tuning device of a bicycle comprising a brake arm 1, a holding seat 2 urging the lateral edge of the brake arm 1, an adjusting bolt 21 being mounted onto the holding seat 2, an adjusting rim 3 mounted on the holding seat 2, a cable 4 having one end mounted to the brake arm 1 and the other end mounted to the holding seat 2, and an annular insert 5 mounted on the fork and being used to secure the brake-tuning device thereto, wherein, a) the brake arm 1 is a substantially elongated structure being mounted onto the left and the right forks 10 of the bicycle, and one lateral edge of the brake arm 1 is mounted with a braking block 11, the bottom of the brake arm 1 is pivotally mounted with a pivot connection 12 which allows the mounting of the holding seat 2 and the adjusting rim for fine-adjustment, and a positioning groove 121 is provided on the pivot connection 12 and an urging protrusion 13 is mounted at an appropriate position on the brake arm 1;

b) the holding seat 2 is linked to the pivot connection 12 at the brake arm 1, and within the holding seat 2, a restrictive slot 22 is provided for the positioning of a stopping block 31 of the adjusting rim 3, and a positioning hole 23 is provided at the holding seat 2 to allow the cable 4 to pass through, a lateral edge of the holding seat 2 is provided with a screw hole 24 for the mounting of the adjusting bolt 21;

c) the adjusting bolt 21 passes through the screw hole 24 of the holding seat 2 and urges the stopping block 31 of the adjustable rim 3, and is used to appropriately adjust the cable 4;

d) the adjusting rim 3 is a stepped member and is inserted into the holding seat 2, and the stopping block 31 is provided at the adjusting rim 3 and is urged with the adjusting bolt 21, an insertion rod 32 is provided at the lateral edge of the adjusting rim 3 and is inserted into a hole 101 provided at the forks 10; and e) the annular insert 5 has one end being mounted on the fork 10 and an urging edge 51 is provided at the bottom end of the insert 5, and the urging edge 51 is engaged with the positioning groove 121 of the pivot connection 12.

In accordance with the present invention, the operation of brake-tuning device is described as follows: when the brake lever (not shown) of a bicycle is applied by pulling the braking cable (not shown), the brake arm 1 drives the braking block 11 to move closer to the bicycle wheel frame (not shown) and the protrusion 13 of the brake arm resists against the movement of the cable 4, and one free end of the cable 4 is urged against the brake arm 1 and the other free end passes through the positioning hole 23 of the holding seat 2, and the holding seat 2 is mounted on the adjusting rim 3 which is mounted on the fork 10 of the bicycle. When the brake arm 1 is pulled and moved, one free end (which urges against the brake arm 1) of the cable 4 is deformed. When the braking cable of the brake lever is released, the brake arm 1 will restore to its original position by means of the cable 4. Thus, the braking operation is completed.

Figure 7:
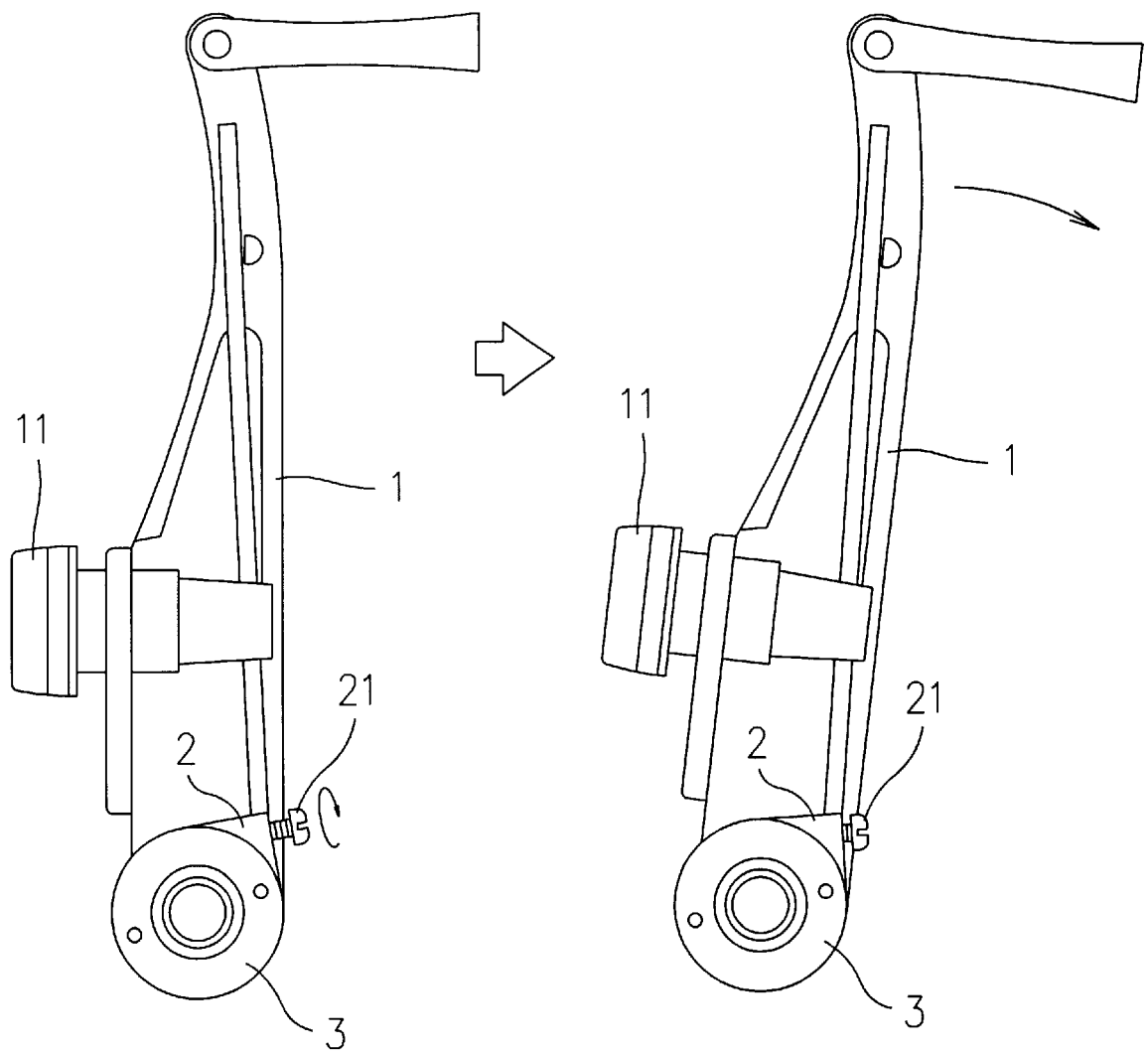
FIG. 7 is sectional views showing a brake-tuning device in accordance with the present invention.
Figure 8:
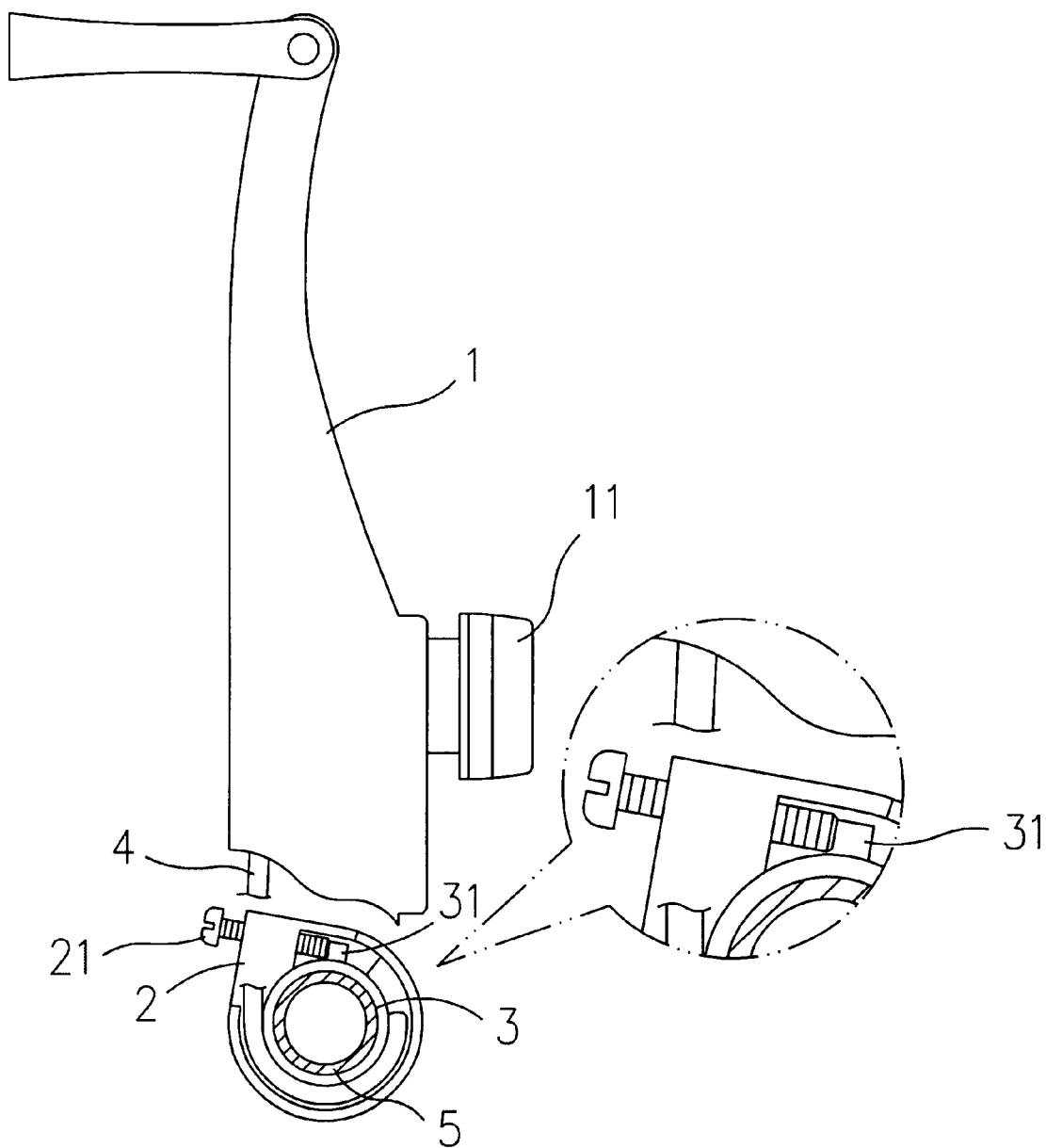
FIG. 8 is a sectional view showing the bolt touches the protrusion of the adjusting rim in accordance with the present invention.

Referring to FIGS. 7 and 8, when the brake arm 1 operation is not balance, the bolt 21 can be adjusted by tuning the bolt inward. At this instance, the adjustable rim 3 is positioned at the hole 101 at the fork by means of the insertion rod 32, this causes the adjustable bolt 21 which urges the stopping block 31 to rotate the holding seat 2, and thus, the cable 4 (having one end mounted to the holding seat 2 and the other end urging against the blocking protrusion 13) is deformed and the distance between the brake arm 1 and the wheel frame is adjusted, and the purpose of braking is achieved.

Numerous variations and modifications can be made without departing from the invention. Accordingly, it should be understood that the form of the invention described above is illustrative only and is not intended to limit the scope of the invention.

I claim:

1. A structure of a brake-tuning device of a bicycle comprising a brake arm, a holding seat urging a lateral edge of the brake arm, an adjusting bolt being mounted onto the holding seat, an adjusting rim mounted on the holding seat, a cable having one end mounted to the brake arm and the other end mounted to the holding seat, and an annular insert mounted on the fork of the bicycle and being used to secure the brake-tuning device thereto, wherein: a) the brake arm is a substantially elongated structure being mounted onto the left and the right forks of the bicycle, and one lateral edge of the brake arm is mounted with a braking block, the bottom of the brake arm is pivotally mounted with a pivot connection which allows the mounting of the holding seat and the adjusting rim for brake-tuning, and a positioning groove is provided on the pivot connection and an urging protrusion is mounted at an appropriate position on the brake arm; b) the holding seat is linked to the pivot connection at the brake arm, and within the holding seat, a restrictive slot is provided for the positioning of a stopping block of the adjusting rim, and a positioning hole is provided at the holding seat to allow the cable to pass through, a lateral edge of the holding seat is provided with a screw hole for the mounting of the adjusting bolt; c) the adjusting bolt passes through the screw hole of the holding seat and urges the stopping block of the adjustable rim, and is used to appropriately adjust the cable; d) the adjusting rim is a stepped member and is inserted into the holding seat, and the stopping block is provided at the adjusting rim and is urged with the adjusting bolt, an insertion rod is provided at the lateral edge of the adjusting rim and is inserted into a hole provided at the forks; and e) the annular insert has one end being mounted on the fork and an urging edge is provided at the bottom end of the insert and the urging edge is engaged with the positioning groove of the pivot connection.

\* \* \* \* \*